Nov. 2, 1926.  1,605,520
A. Y. DODGE
INDICATING INSTRUMENT
Filed March 28, 1925  2 Sheets-Sheet 1
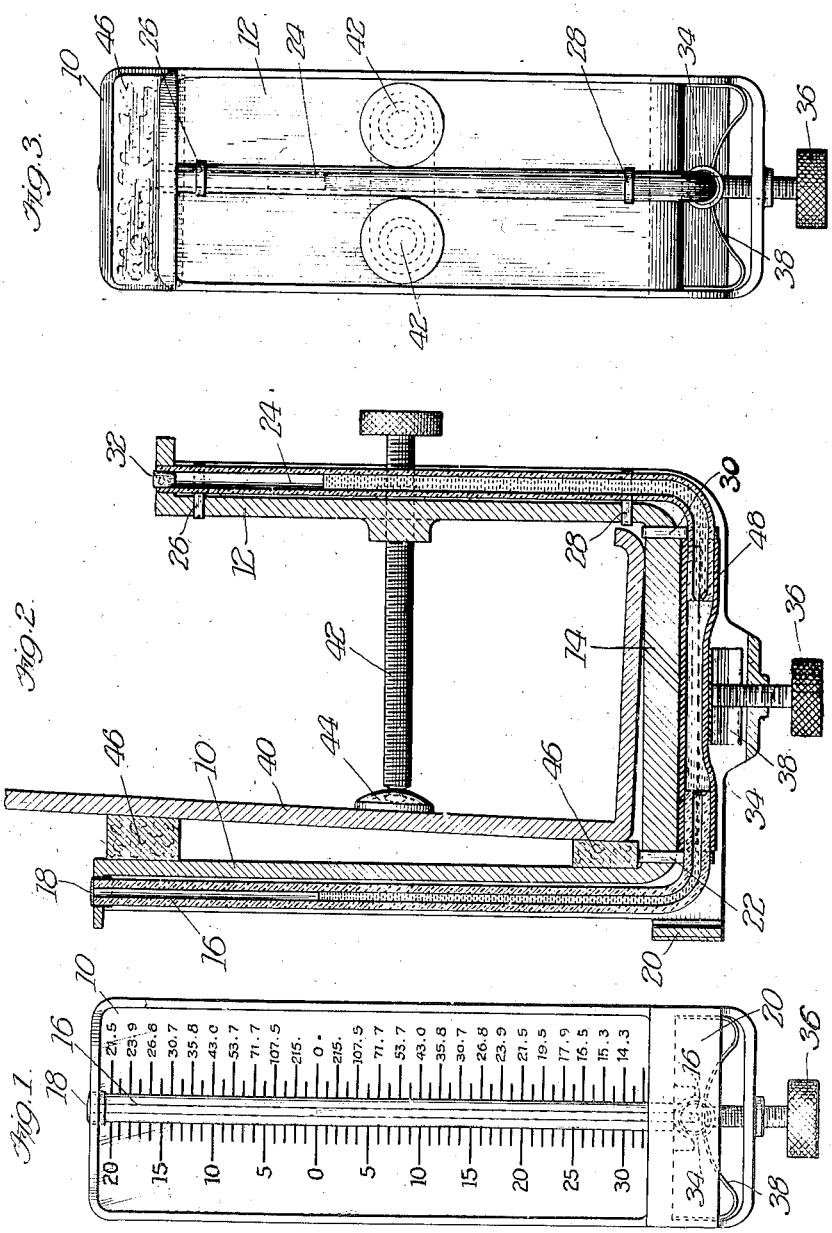
Inventor
Adiel Y. Dodge Nov. 2, 1926.  1,605,520
A. Y. DODGE
INDICATING INSTRUMENT
Filed March 28, 1925  2 Sheets-Sheet 2

Witness
Martin H. Olsen

Inventor
Adiel Y. Dodge
By M. W. McConkey
Atty.

Patented Nov. 2, 1926.

1,605,520

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

INDICATING INSTRUMENT.

Application filed March 28, 1925. Serial No. 18,988.

This invention relates to indicating instruments and is illustrated as embodied in an instrument indicating the deceleration of an automobile when the brakes are applied (i. e. the negative acceleration), or indicating the acceleration when the throttle is opened.

In one desirable arrangement, when the brakes are applied or the throttle is opened, the inertia of a column of liquid such as mercury in a generally horizontal conduit causes the liquid to rise or fall in a connected vertical conduit, to indicate to the driver the positive or negative acceleration. Preferably means is provided for varying the zero height of the liquid, and a scale may be placed beside the vertical conduit, graduated in feet per second per second, or in terms of distance of stopping at twenty miles per hour, or any other desired units.

Other features of the invention relate to novel combinations of parts and desirable particular constructions illustrated in the accompanying drawings, in which:

Fig. 1 is an elevation of one form of instrument, as it appears to the driver when mounted on the instrument board;

Fig. 2 is a central vertical section through the instrument as mounted on the instrument board;

Fig. 3 is an elevation showing the rear side of the instrument;

Figure 4:
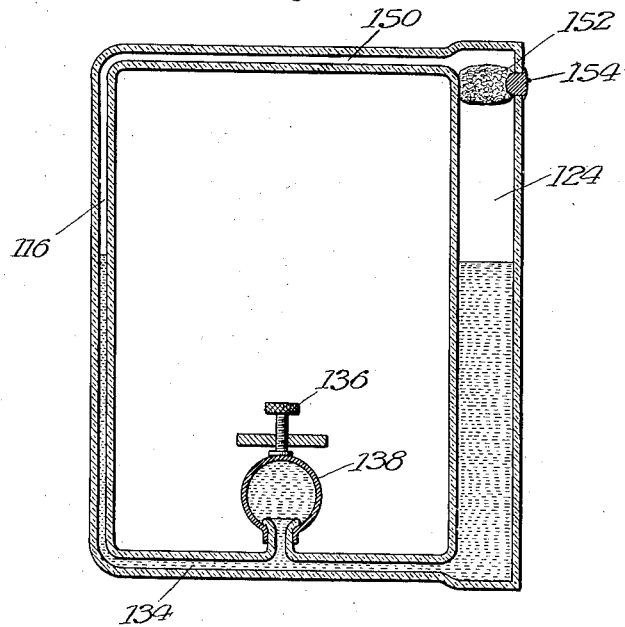
Fig. 4 is a diagrammatic vertical section of a modified instrument.

In the arrangement of Figs. 1-3, the instrument includes a frame, shown as cast of aluminum, having a front vertical part 10 and a rear vertical part 12 connected by a horizontal part 14. A front conduit 16, shown as a glass tube, is held at its upper end by an opening in the top flange of part 10, the upper end being closed by a fabric or chamois cover 18 placed thereover before it is forced into the opening. This cover permits the passage of air, although damping its passage down to a relatively slow rate, and prevents loss of liquid. The bottom of conduit 16 is protected by a U-shaped guard 20. The lower end of the conduit is turned rearwardly and horizontally,—i. e., forwardly of the automobile but rearwardly of the instrument,—and is held by a clip 22.

The rear part 12 of the instrument supports a rear vertical conduit 24, shown as a glass tube, held at its upper end by an opening in the top flange of part 12, and bent forwardly and horizontally at its bottom end, and held by clips 26, 28, and 30. At its upper end the conduit may be closed by a porous plug 32, of cotton or the like, permitting passage of air.

The bottom conduit connection of the instrument, in this form, is a rubber or other flexible tube 34, arranged to be compressed more or less by a set screw 36 operating a leaf spring 38, to vary the level of the mercury in conduit 16 to bring it to zero on its scale, to correct for temperature and for inaccuracies of positioning the instrument. Two scales are shown, that on the left (Fig. 1) being in feet per second per second, and that on the right being in terms of number of feet required to stop from twenty miles per hour, as adopted by the Bureau of Standards in its tests.

The instrument is clamped in place on the instrument-board 40 of an automobile by two screws 42 threaded through openings in the rear part 12, and having swivelled at their ends the heads 44 engaging the rear face of the board. Rubber or other spacing blocks 46 may be fastened to the back of part 10 to hold the instrument more nearly vertical, and to avoid scratching the face of the instrument board.

Too rapid oscillation of the mercury, due to spring action, etc., is damped out by one or more constrictions 48 in the conduits. The instrument is made more sensitive by making the front conduit 16 of smaller diameter with respect to the other conduits. As shown, its diameter is substantially less than that of conduits 24 and 34.

In operation, when the brakes are applied, the momentum of the mercury in the bottom of the instrument causes it to shift forwardly, rising in conduit 24 and falling in conduit 16; while when the throttle is opened the reverse takes place and the mercury rises in conduit 16.

The form shown in Fig. 4 differs from that described above, in that conduits 116, 124, and 134, are all formed as a single tube of glass or the like, conduits 116 and 124 being connected at the top by a horizontal conduit 150 permitting the air to surge back and forth as the mercury shifts. The surging of the air is damped by a plug 152 of cotton or the like, and a suitable plug 154 prevents loss of mercury through the filler opening. The height of the column of mercury is adjusted by a setscrew 136 compressing a bulb 138 of rubber or other material clamped about a projecting neck formed in conduit 134.

Figure 5:
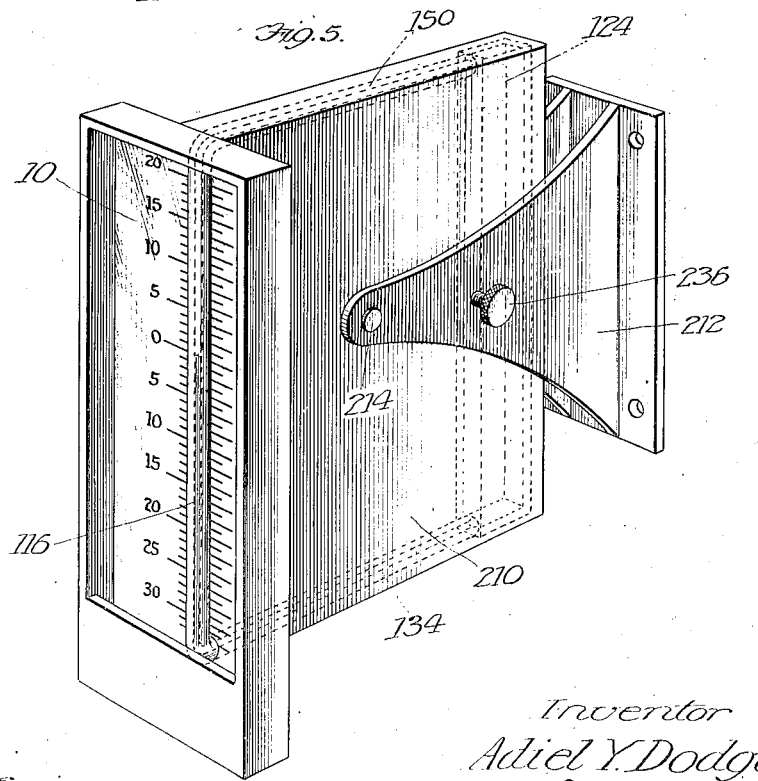
Fig. 5 is a perspective view of a differently-modified instrument.

In the arrangement of Fig. 5, the zero level of the mercury is adjusted by tilting the carrier 210 for the conduits, which is pivotally mounted at 214 between arms of a bracket 212 secured to the instrument board. When adjusted, the carrier is clamped by a setscrew 236.

While several embodiments of the invention have been described in detail, it is not my intention to limit its scope to those particular embodiments, or otherwise than by the terms of the appended claims.

I claim:

1. An instrument comprising, in combination, a U-shaped frame adapted to straddle the bottom of an automobile instrument board, clamping means carried by the rear leg of the frame and engageable with the back of the instrument board, vertical conduits carried by the legs of the frame, a horizontal conduit carried by the bottom of the frame and connecting the vertical conduits, and an indicating liquid in the connected conduits.

2. An instrument comprising, in combination, a U-shaped frame adapted to straddle the bottom of an automobile instrument board, clamping screws threaded through the rear leg of the frame and engageable with the back of the instrument board, and indicating means visible on the front leg.

In testimony whereof I have hereunto signed my name.

ADIEL Y. DODGE.